(12) United States Patent
Luginbill et al.

(10) Patent No.: US 8,033,588 B2
(45) Date of Patent: Oct. 11, 2011

(54) SLIDING LID GUARD

(75) Inventors: Neal W. Luginbill, Marysville, OH (US); David Salmonowicz, Zanesfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 351 days.

(21) Appl. No.: 12/209,717

(22) Filed: Sep. 12, 2008

(65) Prior Publication Data

US 2009/0072568 A1 Mar. 19, 2009

Related U.S. Application Data

(60) Provisional application No. 60/973,621, filed on Sep. 19, 2007.

(51) Int. Cl.
*B60R 7/04* (2006.01)
(52) U.S. Cl. .................. 296/24.34; 296/37.8
(58) Field of Classification Search ........... 296/24.34, 296/37.8, 37.14; D12/415, 423–425; 220/345.1
See application file for complete search history.

(56) References Cited

U.S. PATENT DOCUMENTS

| | | | |
|---|---|---|---|
| 2,172,956 A | 9/1939 | Derman | |
| 4,717,196 A | 1/1988 | Adams | |
| 4,800,619 A | 1/1989 | Hudak | |
| 4,854,632 A | 8/1989 | Kreuze et al. | |
| 5,446,929 A | 9/1995 | Sills et al. | |
| 6,499,785 B2 * | 12/2002 | Eguchi | 296/37.8 |
| 6,616,206 B2 | 9/2003 | Luginbill et al. | |
| 6,702,352 B2 | 3/2004 | Nakanishi et al. | |
| 7,222,906 B2 * | 5/2007 | Sakakibara et al. | 296/24.34 |
| 7,287,795 B1 * | 10/2007 | Thomas | 296/24.34 |
| 7,341,297 B2 * | 3/2008 | Nakamura et al. | 296/24.34 |
| 7,475,954 B1 * | 1/2009 | Latunski | 312/297 |
| 7,513,550 B1 * | 4/2009 | Abro et al. | 296/24.34 |
| 7,581,773 B2 * | 9/2009 | Strasser et al. | 296/1.09 |
| 7,631,917 B2 * | 12/2009 | Kwolek | 296/24.34 |
| 7,641,252 B2 * | 1/2010 | Sturt et al. | 296/24.34 |
| 7,794,000 B2 * | 9/2010 | Ichimaru | 296/24.34 |
| 2003/0127877 A1 * | 7/2003 | Luginbill et al. | 296/37.8 |
| 2005/0189776 A1 * | 9/2005 | Sturt | 296/24.34 |
| 2007/0246963 A1 * | 10/2007 | Thomas | 296/37.8 |
| 2009/0072568 A1 * | 3/2009 | Luginbill et al. | 296/37.8 |

* cited by examiner

*Primary Examiner* — Glenn Dayoan
*Assistant Examiner* — Gregory Blankenship
(74) *Attorney, Agent, or Firm* — Mark E. Duell; Rankin Hill & Clark LLP

(57) ABSTRACT

A guard for a sliding lid that acts as a cover for a cargo area of a center console. The center console includes a bottom, sidewalls, a front wall, and a back wall. Movement of the sliding lid is slidingly restricted by guide rails. The guard includes a body and a wiper section that has a contact edge. The guard is secured to the center console and disposed above the sliding lid and prevents objects from riding on the sliding lid past the guard.

20 Claims, 3 Drawing Sheets

SLIDING LID GUARD

BACKGROUND OF THE INVENTION

1. Field of the Invention

The present invention is directed toward a storage compartment with a sliding lid. In particular, the present invention relates to a guard for the sliding lid.

2. Description of Related Art

Sliding lids, also known as tambour doors, are used in a variety of applications. For example, sliding lids are used on roll-top desks, on delivery trucks as either side or rear cargo doors, and to secure garages or storefronts. Furthermore, the sliding lids can be used as covers for storage compartments in vehicles.

In general, sliding lids provide a compact means for closing a space without requiring a typical one-piece door that swings in an arc about a hinge. Furthermore, sliding lids may be retracted into a recess within the assembly to be conveniently hidden when the sliding lid is opened.

In modern vehicles, it is common to have a storage compartment with a sliding lid. The storage compartment is typically used to store sundry objects that the vehicle occupant would like to have in the vehicle, but also prefers that the objects be contained. The sundry objects may include for example, musical CDs, sunglasses, vehicle owner's manuals, maps, keys, mobile telephones, pens, pencils, and facial tissues. By placing the sundry objects in the storage compartment, the objects are easily accessible, but still contained. By containing the objects, the likelihood of the objects becoming airborne is reduced in the event of a vehicle collision. Accordingly, the risk of injury from airborne objects is reduced. Furthermore, since the sundry objects are not in plain view, appearance of the vehicle interior is increased.

Typically, the storage compartment with the sliding lid is a portion of a center console of the vehicle. The center console is between the front seats of the vehicle. However, the storage compartment may alternatively be located in the vehicle dashboard or in the vehicle door. Access to the cargo area of the storage compartment is accomplished by retracting at least a portion of the sliding lid into the center console.

Many times, a cup holder, a coin holder, or other open bin is located near the center console in the vehicle. Accordingly, it is normal for an object, such as for example, a toll road ticket, a credit card receipt, or a coin (hereinafter "object"), to be placed on the sliding lid when the sliding lid is in a closed position (e.g. fully extended). When the sliding lid is opened (e.g. retracted), a portion of the sliding lid travels into an area of the center console that is inaccessible to the vehicle occupant. When the sliding lid is being opened, the object may ride on top of the sliding lid. Unfortunately, this can result in the object being relocated to the inaccessible area. Many times, when the object is in the inaccessible area, the object becomes dislodged from the sliding lid. This results in the object being lost and inaccessible to the vehicle occupant, even after the sliding lid is returned to the closed position.

Therefore, there exists a need in the art for an apparatus that prevents objects from traveling on the sliding lid when the sliding lid is being opened.

SUMMARY OF THE INVENTION

The present invention is directed toward a center console with a sliding lid. More specifically, the present invention includes a guard that prevents objects carried on the sliding lid from falling into an inaccessible area.

The center console may be installed in a vehicle. Alternatively, the guard and the sliding lid may be utilized with a stand-alone storage device.

BRIEF DESCRIPTION OF THE DRAWINGS

These and further features of the invention will be apparent with reference to the following description and drawings, wherein:

FIG. 4 is a sectional view of a guard and a sliding lid.

DETAILED DESCRIPTION OF THE PREFERRED EMBODIMENTS

Figure 1:
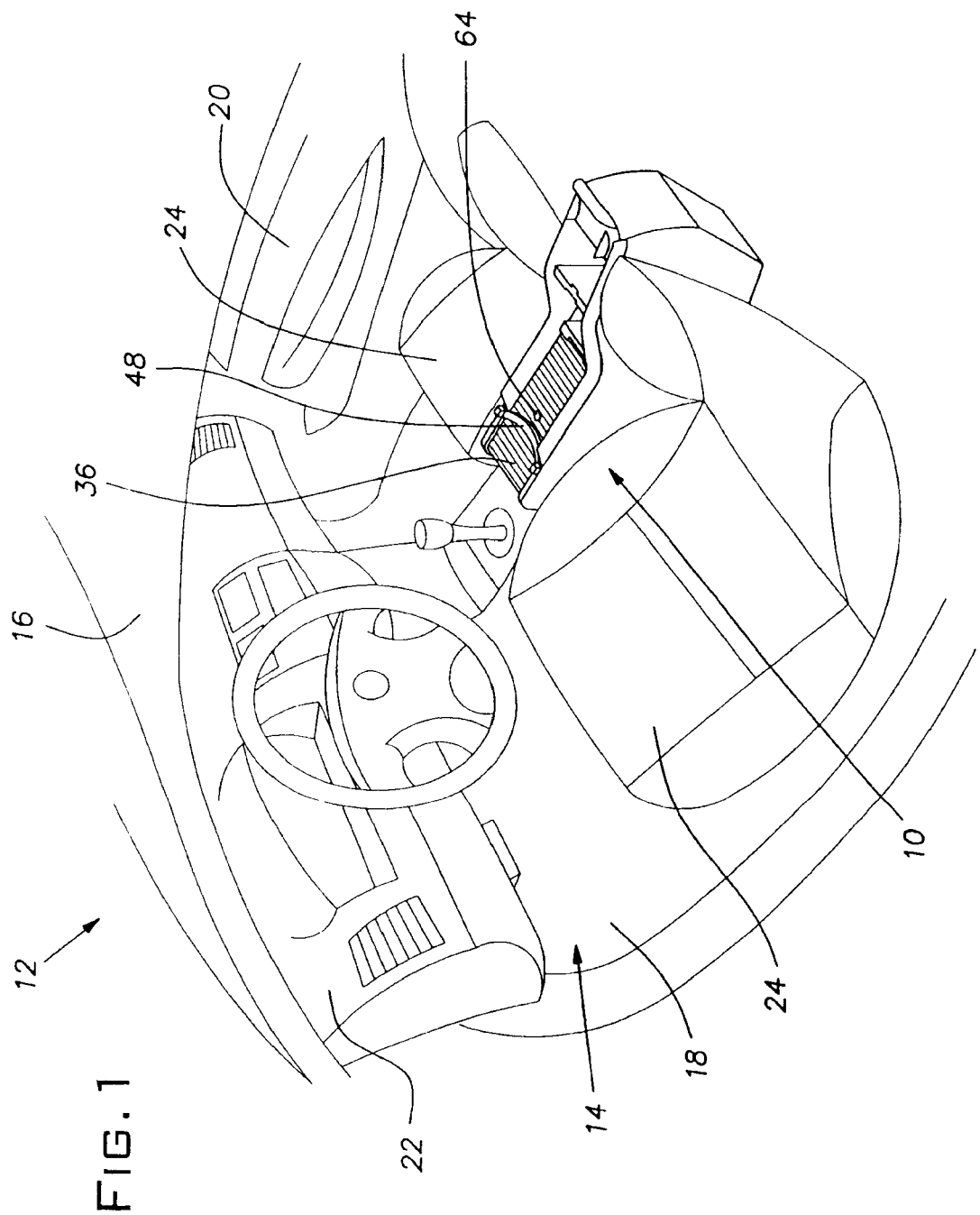
FIG. 1 is a perspective view of the present invention installed in a vehicle.

With reference to FIGS. 1-4, a center console 10 according to the present invention is shown installed in a vehicle 12. An interior 14 of the vehicle 12 is surrounded by a roof 16 and a floor 18 in a height direction, and doors 20 in a width direction. The interior 14 further includes a dashboard 22 and seats 24.

The center console 10 includes sidewalls 26 with guide rails 28, a front wall 30, a back wall 32, a bottom 34, and a sliding lid 36 that cooperate to define a cargo area 38. The guide rails 28 have a first section 40, a second section 42, and a third section 44. Guide rail garnishes 46 cover a portion of the guide rails 28. The center console 10 further includes a guard 48, a handle 50, a front trim piece 52, and a rear open bin 54. A floor bracket 56 attaches the center console 10 to the floor 18.

Figure 2:
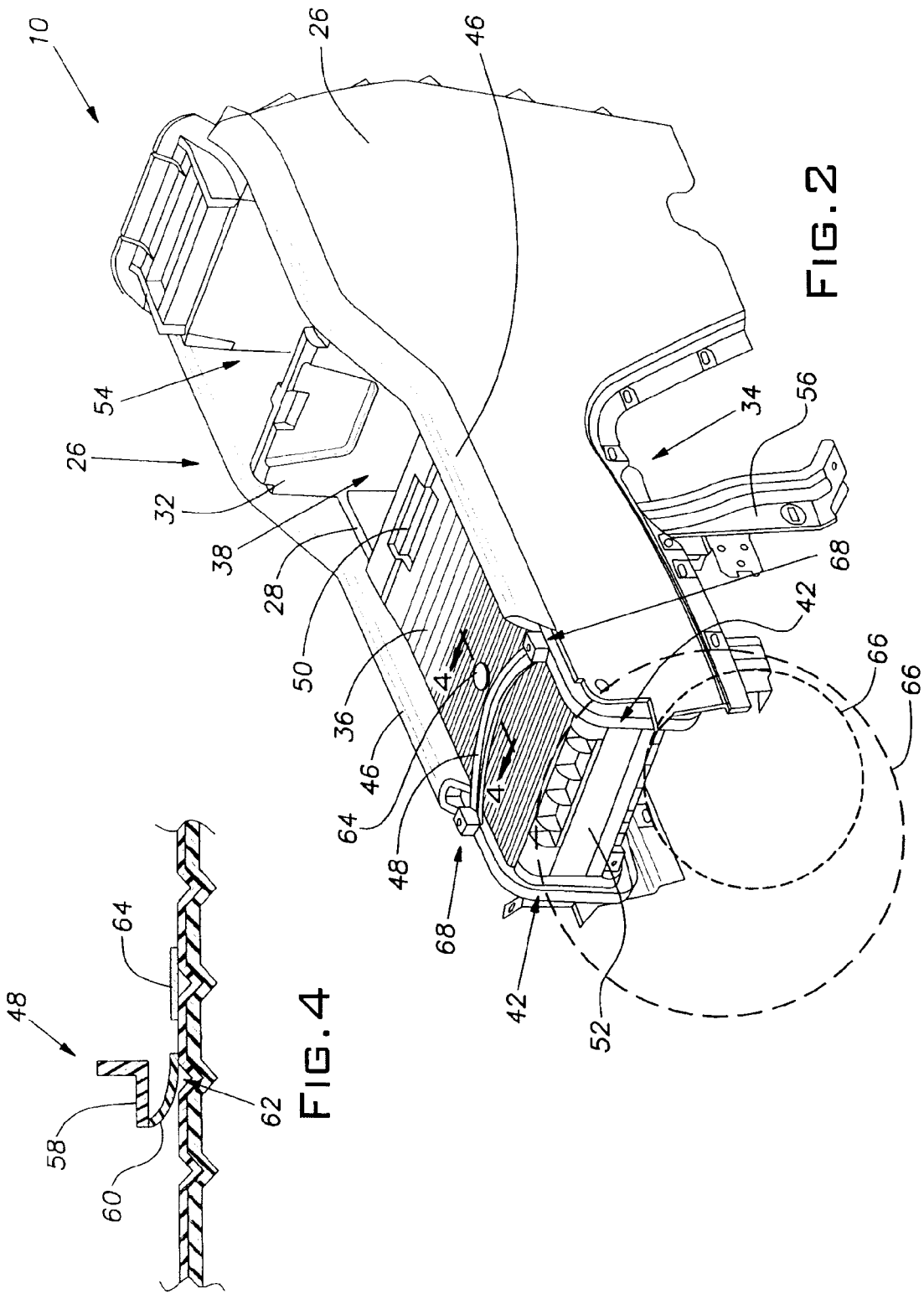
FIG. 2 is a perspective view of a center console.

With specific reference to FIGS. 2 and 4, the guard 48 has a main body 58, a wiper section 60 with a contact edge 62, and mounting brackets 68 at each end of the main body 58. The guard 48 prevents an object 64 from traveling into an inaccessible area 66, as is shown in FIG. 2. Furthermore, the mounting brackets 68 include side members 70 and a top 72. The mounting brackets 68 are present at each end of the guard 48 for interaction with mounting pads 74 of the guide rails 28.

The sidewalls 26 of the center console 10 extend from the floor 18 toward the roof 16 in a height direction. In a width direction, the front wall 30 and the back wall 32 of the center console 10 extend between the seats 24. In a length direction, the sidewalls 26 of the center console 10 occupy a space between a back of the seats 24 and the dashboard 22. The center console 10 may also contain a shift lever (not shown) for changing gears in the vehicle 12. Furthermore, an emergency brake lever (not shown) may be situated near the center console 10. By incorporating the sliding lid 36 into the center console 10, a finished look to the interior 14 of the vehicle 12 is achieved and easy access to the cargo area 38 by a vehicle occupant (not shown) is ensured.

The bottom 34 of the center console 10 generally follows a contour of the vehicle floor 18, but may be raised above the floor 18. Objects placed in the cargo area 38 may come in contact with the bottom 34, or there may be some type of trim or garnish that is disposed above the bottom 34 that provides a type of false bottom.

The sidewalls 26 of the center console 10 vertically extend in the height direction from the floor 18 toward the roof 16. The center console 10 may be directly attached to the floor 18 with the floor bracket 56 or alternatively, the center console 10 may be attached to other intermediary components between the center console 10 and the floor 18. While the open rear bin 54 is illustrated as being disposed behind the cargo area 38, an arm rest (not shown) could be installed in place of, or in addition to, the open rear bin 54.

The guide rails 28 are generally parallel to each other and extend in a generally horizontal plane along the sidewalls 26, as will be discussed hereinafter. The guide rails 28 slidingly restrict movement of the sliding lid 36 by engaging the sides of the sliding lid 36. The guide rails 28 may be channeled into the sidewalls 26 or may extend out from the sidewalls 26 toward the sliding lid 36. A portion of the guide rails 28 is covered by the rail garnishes 46.

The sliding lid 36 has a number of elongated thick-wall sections connected to each other by thin-wall sections and is of a common construction. The sliding lid 36 may be formed of a soft synthetic resin material. Alternatively, the sliding lid 36 may be made of wood or have a topcoat of a soft material and a substrate of a hard plastic. Various material compositions are contemplated and possible. When the sliding lid 36 is opened, the sliding lid 36 is retracted into the center console 10.

The guide rails 28 are attached to upper ends of the sidewalls 26 and horizontally extend between from the front wall 30 and the back wall 32 to form the first section 40. When the object 64 is on top of the sliding lid 36 in the first section 40, the object 64 is accessible to the vehicle occupant.

The second section 42 of the guide rails 28 starts near the front wall 30 and extends downward toward the floor 18. Objects on the sliding lid 36 in the second section 42 are not accessible to the vehicle occupant. Furthermore, the guide rails 28 in the second section 42 are not easily viewed unless the center console 10 is removed from the vehicle 12 and dissembled.

The third section 44 of the guide rails 28 horizontally extends from a lower portion of the second section 42 toward the back wall 32 of the center console 10. Objects on the sliding lid 36 in the third section 44 are also not accessible by the vehicle occupant. Furthermore, the guide rails 28 in the third section 44 are not easily viewed unless the center console 10 is removed from the vehicle 12 and dissembled.

The layout of the first, second, and third sections 40, 42, 44 can generally be described as a sideways letter U, when viewed from a side perspective through the opening for the door 22. However, it is known in the art that the guide rails 28 can be of different configurations, such as for example, a pattern in which the third section 44 is omitted. Furthermore, the guide rails 28 may be configured so that the sliding lid 36 is wound about a spool after leaving the first section 40. The guard 48, which will be discussed in more detail hereinafter, will work equally well with these configurations. However, as the guide rails 28 are not central to the invention, only one variation is illustrated.

Figure 3:
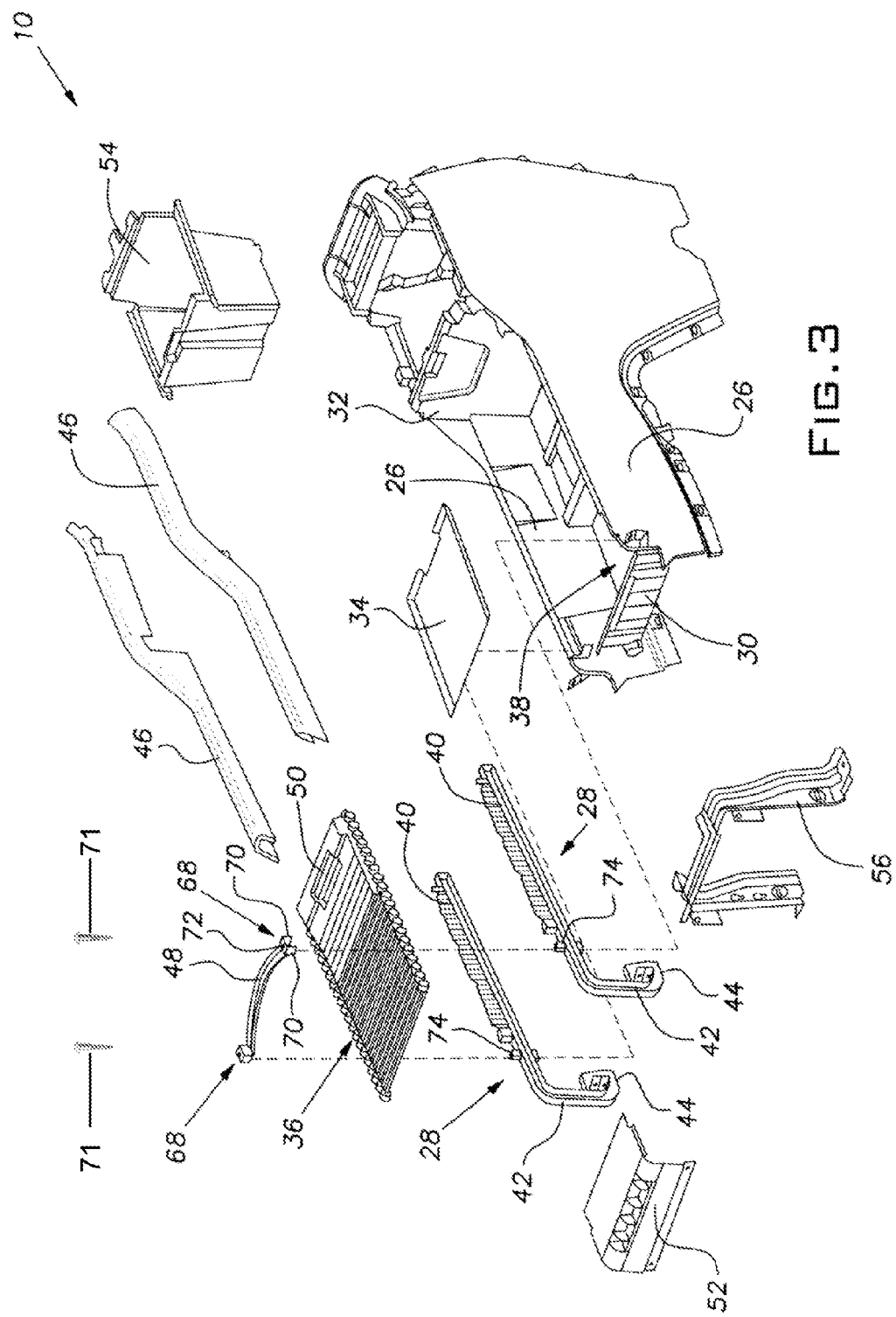
FIG. 3 is a exploded view of the center console.

In FIG. 3, the center console 10 is removed from the vehicle 12 and dissembled, and the front wall 30 is visible. After the center console 10 is installed into the vehicle 12, the front wall 30 is covered by the front trim piece 52. Thus, the front wall 30 is not visible after assembly and installation in the vehicle 12. The inaccessible area 66 is located in a region between the second and third sections 42, 44 of the guide rails 28. For ease of understanding, the inaccessible area 66 is generally indicated with dashed-line two circles in FIG. 2. However, it is understood that the inaccessible area 66 could be any area that would be difficult for a vehicle occupant to retrieve the object 64.

With continued reference to FIGS. 2-3, the guard 48 is somewhat arc-shaped or C-shaped, extending between the sidewalls 26. Alternatively, the guard 48 could be more linear-shaped. Also alternatively, the guard 48 can be V-shaped and extend between the sidewalls 26. With any of the shaped guards, the guards may alternatively be pivoted 180°, as viewed from a top view. For example, when viewed from the top view, the guard 48 could look C-shaped or could look similar to a backwards letter C.

As is shown in FIG. 4, the guard 48 is comprised of the main body 58, the wiper section 60, and the mounting brackets 68. The guard 48 may be molded as one piece or the guard 48 may be made of a plurality of pieces that are assembled together. As is also shown in FIG. 4, the main body 58 is illustrated as being somewhat L-shaped and the wiper section 60 is illustrated as being of a generally quarter-round arc-shape. However, other shapes are possible for the main body 58 and the wiper section 60. Preferably, the wiper section 60 of the guard 48 exerts a slight downward pressure on the sliding lid 36. Alternatively, the wiper section 60 may be situated so that there is a minimum distance between the contact edge 62 and the sliding lid 36. Preferably, the minimum distance is less than one inch. More preferably, the minimum distance is less than one-fourth of one inch.

As illustrated in FIG. 3, the guard 48 is attached to the center console 10 with fasteners 71 that extend vertically downward through the mounting brackets 68. The fasteners 71 further extend into the mounting pads 74 of the guide rails 28 to provide a secure method of attachment. Alternatively, an adhesive or other method of fastening, as is known in the art, could be used to attach the mounting brackets 68 of the guard 48 to the mounting pads 74.

The mounting brackets 68 are disposed at opposite ends of the guard 48. In addition, the mounting brackets 68 are of a generally inverted U shape and are made up of the side members 70 and the top 72, as shown in FIG. 3. Vertical bores extend through the top 72 of the mounting brackets 68. While not illustrated, additional walls that are similar in size and shape to the side members 70, may be added to the mounting brackets 68 to aid in alignment and to provide increased strength to the connection with the mounting pads 74. These additional walls would be disposed in a vertical direction generally perpendicular to the side members 70.

The mounting pads 74 are disposed on a top surface of the guide rails 28. The mounting pads 74 are of a generally rectangular shape and are compatible in shape with the mounting brackets 68. In particular, the mounting pads 74 are sized so as to be received between the side members 70 of the mounting brackets 68. In addition, a vertical bore vertically extends from a top of the mounting pads 74 downward toward the guide rails 28. The vertical bore receives the fastener 71 that extends downward through the top 72 of the mounting bracket 68.

As illustrated, the main body 58 and the wiper section 60 are attached to the mounting brackets 68. Alternatively, only the main body 58 or the wiper section 60 could be attached to the mounting brackets 68. In addition, the guard 48 is shown as a structure that is separate from the center console 10. However, the guard 48 could be molded as one piece with the center console 10. The guard 48 may be made of a soft rubber or plastic material; however, other materials are possible and contemplated.

To gain access to the cargo area 38, and when the sliding lid 36 is closed (e.g. fully extended toward the rear open bin 54), the vehicle occupant would push the handle 50 forward (e.g. toward the dashboard 22). The sliding lid 36 would then retract into the center console 10. If the object 64 was located on the sliding lid 36, the object 64 would come into contact with the guard 48 and be prevented from entering the inaccessible area 66. Accordingly, the guard 48 stops the object 64 from continuing to ride on the sliding lid 36. Therefore, the vehicle occupant could then easily remove the object 64 from the sliding lid 36, since the object 64 did not get relocated to the inaccessible area 66.

It should be noted that variants of the guard 48 and sliding lid 36 could be installed in a variety of other locations in the vehicle 12. For example, with some minor modifications, the guard 48 and sliding lid 36 could be installed in the door 22 or in the dashboard 22 of the vehicle 12. Either of these locations offers a convenient place for the cargo area 38 and installation of the guard 48 and the sliding lid 36. Additionally, the guard 48 may be integrated with a number of devices separate from the vehicle 12. The guard 48 may be employed with a cabinet or a piece of furniture that utilizes a sliding lid or tambour door. For example, the guard 48 could be used with the tambour door of a roll-top desk.

The guard 48 of the present invention prevents objects 64 from traveling on the sliding lid 36 to an inaccessible area 66. As stated hereinbefore, the guard 48 can be adapted to work with a variety of applications. It is considered apparent that the guard 48 would be beneficial to have for any type of application that used a roll-up type door. Since the guard 48 prevents objects 64 from being lost or inadvertently relocated, time and effort are saved, since no complex disassembly of the center console 10 is required to retrieve the object 64.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A center console for storing objects in a vehicle, comprising:
    a pair of generally parallel spaced sidewalls extending in horizontal and vertical directions;
    guide rails extending along the sidewalls;
    a back wall connecting the sidewalls;
    a front wall connecting the sidewalls and opposite the back wall, the front wall, the back wall, and the guide rails cooperating to define an opening to a cargo area of the center console;
    a sliding lid traveling along the guide rails to define an opening direction and a closing direction, the sliding lid including an interior face facing the cargo area and an exterior face opposite the interior face; and
    a guard extending between the sidewalls and including an apex pointing in the closing direction of the sliding lid, the guard being affixed to the sidewalls so as to be longitudinally spaced from the front wall and the back wall, wherein the guard prevents objects that are on the exterior face of the sliding lid from being relocated past the guard.

2. The center console of claim 1, the guard including a main body and wiper section, the main body having a sideways L-shaped cross section and the wiper section extending from the main body toward the sliding lid in a curved manner.

3. The center console of claim 2, wherein the wiper section is generally quarter-round arc-shaped.

4. The center console of claim 2, wherein the wiper section also includes a contact edge that faces the sliding lid.

5. The center console of claim 4, wherein the contact edge exerts pressure on the sliding lid.

6. The center console of claim 1, wherein the guard is C-shaped.

7. The center console of claim 1, wherein a portion of the guide rails are covered by guide rail garnishes, the guide rail garnishes including upper portions and lower portions, the upper portions being vertically offset from the sliding lid a distance greater than the lower portions.

8. The center console of claim 1, further comprising:
    a bottom wall extending between the sidewalls, wherein the front wall cooperates with the bottom wall, the sidewalls, the back wall, and the sliding lid to define the cargo area.

9. The center console of claim 2, wherein the main body extends laterally and includes a vertical wall and a horizontal wall, the vertical wall being generally perpendicular to the sliding lid and including a free end facing away from the sliding lid and an attached end from which the horizontal wall extends.

10. The center console of claim 9, the wiper section including a first end attached to the horizontal wall of the main body, and a second end including a contact edge contacting the sliding lid.

11. The center console of claim 1, wherein the guard is spaced from the back wall in the closing direction of the sliding lid.

12. The center console of claim 7, wherein the guard is generally coplanar with the lower portions of the guide rail garnishes.

13. The center console of claim 8, wherein the guard is longitudinally located between the front wall and the back wall.

14. A center console for storing objects in a vehicle, comprising:
    a pair of generally parallel spaced sidewalls that extend in horizontal and vertical directions, wherein guide rails extend along the sidewalls;
    a back wall that connects the sidewalls;
    a sliding lid that travels along the guide rails;
    a guard including a main body, the guard extending between the sidewalls, wherein the guard prevents objects that are on the sliding lid from being relocated past the guard; and
    mounting brackets are provided at each end of the main body, said mounting brackets having a generally inverted U shape with vertical bores that extend through a top of the mounting bracket.

15. The center console of claim 14, wherein fasteners vertically extend downward through the pair of mounting brackets into mounting pads on the guide rails.

16. The center console of claim 15, wherein the mounting brackets include side members and the top that are disposed over the mounting pads.

17. A guard for limiting a range of movement of objects on a sliding lid, comprising:
    a main body having a sideways L-shaped cross section, said main body including a vertical wall and a horizontal wall;
    a wiper section of a generally quarter-round arc-shaped cross section with a first end and a second end, wherein the first end is attached to the horizontal wall of the main body and the second end includes a contact edge for contact with the sliding lid; and
    a pair of mounting brackets, each of said mounting brackets being secured to an end of the main body, wherein the mounting brackets have a generally inverted U shape with vertical bores that extend through a top of the mounting bracket, and wherein side members and the top of the mounting brackets cooperate to receive a mounting pad.

18. The guard of claim 17, wherein the contact edge exerts pressure on the sliding lid.

19. The guard of claim 17 further including an apex pointing in a closing direction of the sliding lid.

20. The center console of claim 17, wherein the contact edge exerts pressure on the sliding lid.

* * * * *